United States Patent [19]

Freissle

[11] 4,219,161

[45] Aug. 26, 1980

[54] QUICK DISCONNECT SPRAY NOZZLE

[75] Inventor: Manfred F. A. Freissle, Johannesburg, South Africa

[73] Assignee: Screenex Wire Weaving Manufacturers (Prop.) Limited, Alberton, South Africa

[21] Appl. No.: 882,065

[22] Filed: Feb. 28, 1978

[30] Foreign Application Priority Data

Mar. 8, 1977 [ZA] South Africa .................... 77/1362

[51] Int. Cl.² ............................................. B05B 1/26
[52] U.S. Cl. .................................. 239/523; 239/600; 285/39; 285/DIG. 22
[58] Field of Search ............... 239/600, 550, 551, 542, 239/522, 523; 285/DIG. 22, 423, 24, 27, 39

[56] References Cited

U.S. PATENT DOCUMENTS

| 1,177,884 | 4/1916 | Molesta et al. ............... 239/550 X |
| 2,921,488 | 1/1960 | Davis ............................. 239/550 X |
| 3,231,300 | 1/1966 | Moroney ..................... 285/DIG. 22 |
| 3,308,998 | 3/1967 | Oppasser et al. ............ 285/DIG. 22 |
| 3,770,004 | 11/1973 | Johnson et al. ................. 285/24 X |
| 3,799,453 | 3/1974 | Hart .................................. 239/233 X |
| 4,037,791 | 7/1977 | Mullett et al. ..................... 239/542 |

FOREIGN PATENT DOCUMENTS

1487141  6/1967  France ..................................... 239/600

*Primary Examiner*—Andres Kashnikow

[57] ABSTRACT

The invention provides for a spray nozzle and spray nozzle mounting in which the spray nozzle is removable and includes a tubular spigot and a spray-forming part, the tubular spigot having a passage extending therethrough and having a configuration whereby the spigot can be removably clipped in spigot and socket fashion to a fluid supply line to permit fluid flow from the fluid line through the passage. The spray nozzle mounting comprises a projection fast with or attachable to a fluid suply line and having a passage extending therethrough, the projection having a configuration whereby the spray nozzle can be removably mounted by the tubular spigot being removably clipped to the projection in a spigot and socket fashion.

1 Claim, 5 Drawing Figures

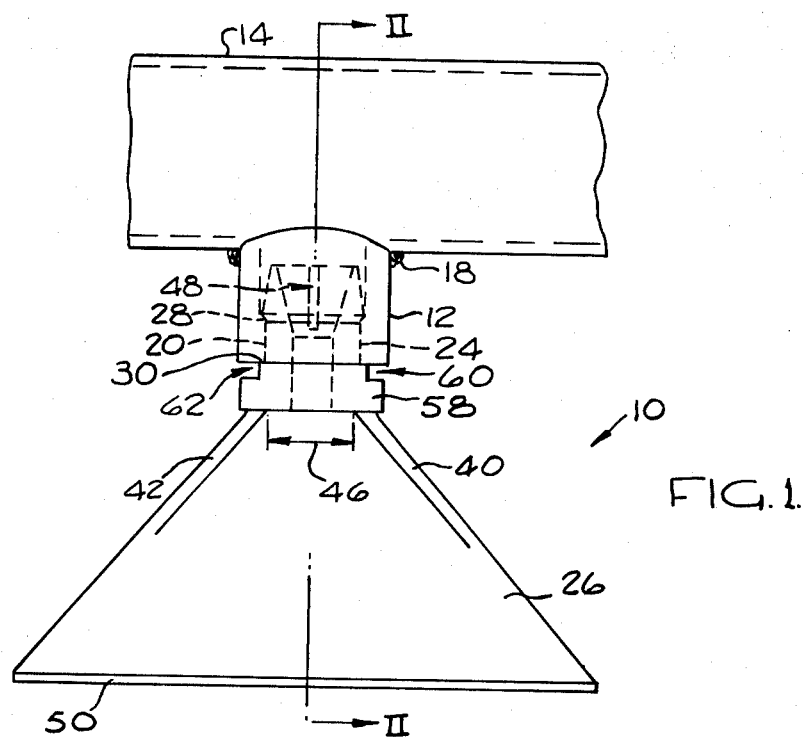
FIG. 1.
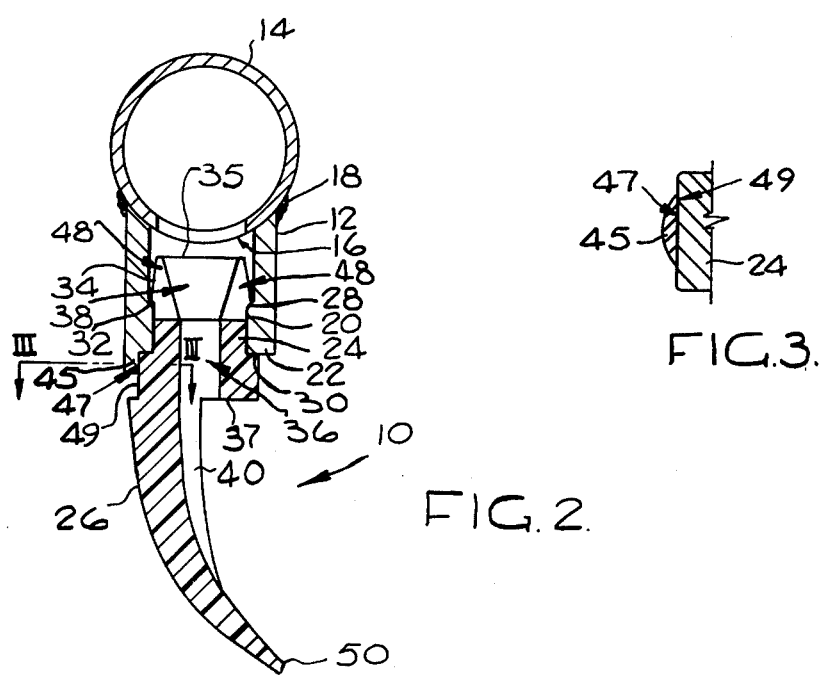
FIG. 2.
FIG. 3.

QUICK DISCONNECT SPRAY NOZZLE

BACKGROUND TO THE INVENTION

This invention relates to a spray nozzle. The invention relates in particular to a removable spray nozzle. Still further the invention relates to a spray nozzle mounting and to a tool for removing a spray nozzle.

Removable spray nozzles known to the applicant are provided with screw threads by means of which the nozzles can be removably screwed into a fluid supply line. Spray nozzles provided with screw threads have certain disadvantages such as that it is time consuming to replace such a nozzle in view of the time taken to screw the nozzle out of the fluid line and to screw a new nozzle into the line. A further disadvantage is that the orientation of the spray nozzle is usually determined by the position of the screw threads on the nozzle so that if screw threads become worn or if screw threads are not always identically positioned on the spray nozzles, the spray nozzles on the fluid lines could be disorientated.

According to the invention there is provided a spray nozzle which is removable and which includes a tubular spigot and a spray-forming part, the tubular spigot having a passage extending therethrough and having means whereby the spigot can be removably clipped in spigot and socket fashion to a fluid supply line to permit fluid flow from the fluid line through the passage.

Further according to the invention there is provided spray nozzle mounting means comprising a projection fast with or attachable to a fluid supply line and having a passage extending theretrough, the projection having means whereby a spray nozzle having a tubular spigot can be removably mounted by the tubular spigot being removably clipped to the projection in a spigot and socket fashion.

The tubular spigot may be resiliently deformable in order to permit it to be removably clipped to the fluid supply line. Alternatively, or in addition, the projection on the fluid supply line may be resiliently deformable.

The projection on the fluid supply line may in one arrangement be of a tubular form having a socket in which the tubular spigot on the spray nozzle is receivable. In this arrangement the exterior surface of the tubular spigot may be engageable with the bore of the tubular projection.

In an alternative arrangement, the passage through the tubular spigot may be of such a dimension that the position on the fluid supply line is receivable therein, i.e. the exterior surface of the projection engages the bore of the passage through the tubular spigot.

The spray nozzle may be of a synthetic plastic material, more particularly a plastic material which is abrasion-resistant, such as polyurethane. The spray nozzle may be moulded in this material, for example by means of injection moulding.

The means whereby the tubular spigot may be releasably clipped to the fluid supply line may include a pair of axially spaced annular shoulders defining between them an annular recess. An annular ridge provided in the bore of the tubular projection on the fluid supply line may be snugly receivable in the annular recess to thereby position the nozzle on the fluid line. The shoulders restrain the nozzle against axial movements.

The annular shoulder nearest to the free end of the tubular spigot may have sloping sides to facilitate the insertion of the tubular spigot into and its removal from the socket in the tubular extension on the fluid line. In this arrangement one sloping face of the frontmost shoulder may form a convergent outer surface on the free end of the tubular spigot.

There may be provided means for preventing the spray nozzle from rotational angular movement with respect to the fluid line so that the spray nozzle is always orientated in a predetermined position with respect to the fluid line. The means may comprise a projecting formation on the tubular projection on the spray nozzle mounting means having a flat surface engageable with a complementary flat surface on the spray nozzle.

The passage through the tubular spigot may have a portion which converges from the free end of the spigot axially inwardly in the flow direction of fluid through the passage. With this arrangement, if a solid object which is entrained in the fluid fed into the passage from the fluid supply line lodges in the converging portion of the passage, the fluid pressure acting on the solid object forces the tubular wall of the spigot defining the converging passage in a direction towards or against the bore of the tubular projection. Thereby the foremost annular shoulder on the tubular spigot is caused to engage the annular projection on the tubular projection more firmly and thus dislodgement of the spray nozzle from the tubular projection on the fluid line is resisted.

In order to facilitate the deformation of the tubular spigot during insertion into or withdrawal from the tubular projection on the fluid line, axially extending radial slits may be provided in the wall of the tubular spigot.

The tubular spigot may be clipped into the tubular projection on the fluid line by means of a tight interference friction fit, or alternatively, in a bayonet arrangement.

The spray-forming part of the spray nozzle may comprise a deflector plate positioned on the downstream side of the passage extending through the tubular spigot. The deflector plate may be so positioned that it interferes with fluid passing through the passage and deflects the fluid to convert the fluid flow from a stream to a spray. The deflector plate may be curved and may have a triangular configuration diverging away from the passage. A pair of ridges may be provided on the deflector plate, one on each side of the passage extending through the tubular spigot, to guide the fluid flow as it emerges onto the deflector plate after passing through the passage through the tubular spigot.

The invention further extends to a tool for removing a spray nozzle in accordance with the invention from a fluid flow line, the tool being of lever form and having a forked part engageable with the spray nozzle and which is adapted to be interposed between the spray nozzle and the fluid flow line and by lever action to prise the nozzle from the fluid flow line.

The invention still further extends to an ore washing screen including spray nozzles and/or spray nozzle mounting means in accordance with the invention.

The invention is now described by way of examples, with reference to the accompanying drawings in which:

FIG. 1 shows a front view of a spray nozzle in accordance with the invention mounted in a fluid flow line;

FIG. 2 shows a section on line II—II of FIG. 1;

FIG. 3 shows a section on line III—III of FIG. 2;

Figure 5:
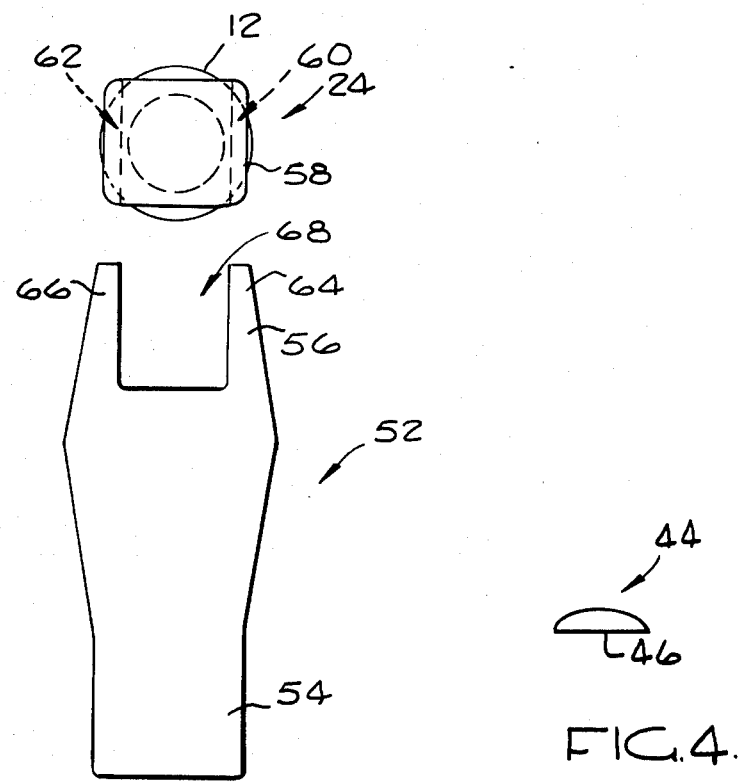
FIG. 5 shows a plan view of a tool for removing the spray nozzle shown in FIG. 1.

Referring to FIGS. 1 and 2, reference numeral 10 indicates the spray nozzle in general. It is of a hard-wearing synthetic plastic material, polyurethane. The spray nozzle is shown mounted in a tubular projection 12 extending from a liquid supply line 14 around an aperture 16 provided through the supply line 14. The tubular extension 12 is of steel and is welded along the joint 18 to the supply line 14 which is also of steel. The tubular extension 12 has an annular ridge 20 extending inwardly from its free end 22.

The spray nozzle 10 is moulded in one piece from polyurethane and includes a tubular spigot 24 and a curved deflector plate 26. The tubular spigot 24 has a pair of axially spaced annular shoulders 28 and 30 between which the annular ridge 20 on the inner surface of the tubular extension 12 is receivable in a friction interference fit. The annular shoulder 28 is defined by two intersecting sloping annular faces 32 and 34. The sloping face 34 constitutes a converging surface at the free end 35 of the tubular spigot 24.

Figure 4:
FIG. 4 shows an alternative cross-section of elongate configuration of the passage extending through the spray nozzle shown in FIGS. 1 and 2.

An axial passage 36 extends through the tubular spigot 24 and has a frusto-conical diverging part 38 inwardly of the end of the spigot. The passage 36 opens onto the deflector plate 26 between two ridges 40 and 42 which assist in guiding the liquid discharged from the passage 36 onto the deflector plate 26. The passage 36 shown in FIGS. 1 and 2 of the drawings is of circular cross-section. If desired however, the passage 36 may have an elongate configuration 44 as shown in FIG. 4 so that the long axis 46 of the profile is equal to the distance between the ridges 40 and 42 where these ridges meet the spigot 24. The elongate profile 44 ensures that when the liquid is discharged from the passage 36, the liquid is immediately in contact with the ridges 40 and 42 and thus discharges the liquid over a larger area onto the deflector plate 26 and thus facilitates the forming of a spray by the deflector plate 26. If further desired, the passage 36 may slope through the spigot 24 instead of being at right angles to the face 37 as shown.

By being of a plastics material, for example polyurethane, the tubular spigot 24 is deformable so that it can be inserted into the bore of the tubular extension 12. In order to facilitate deformation of the tubular spigot 24, radial slits 48 are provided in the tapering front portion of the spigot, the radial slits 48 extending axially inwardly from the end of the spigot 24 for approximately the same axial length as the diverging part 38 of the axial passage 36.

Referring further to FIG. 2 and also to FIG. 3, there is provided a formation 45 on the tubular extension 12 and projecting from the end 22. The projecting formation 45 has a flat surface 47 which is engageable with a complementary flat surface 49 on the tubular spigot 24. When the surfaces are thus in engagement as shown in FIG. 3, the nozzle 10 is prevented from rotating in the tubular projection 12 so that thereby the spray nozzle 10 is orientated in a predetermined position with respect to the fluid line 14 as shown in FIGS. 1 and 2.

The spray nozzle 10 is used as follows:

The deflector plate 26 of the spray nozzle is gripped by a person between his fingers and is forced in an axial direction into the bore of the tubular extension 12. The converging outer face 34 on the front end of the tubular spigot 24 facilitates the insertion of the spigot into the tubular extension 12. Since the tubular spigot is of polyurethane, and also by virtue of the radial slits 48, the deformation of the tubular spigots 24 is facilitated in order to permit it to be inserted into the tubular extension 12.

The tubular spigot 24 is axially inserted into the tubular extension 12 until the annular formation 20 on the inside of the tubular extension 12 clips into the recess between the annular shoulders 28 and 30 provided on the exterior surface of the tubular spigot 24. The shoulder 20 is engaged in a frictional interference fit between the shoulders 28 and 30 and the flat surfaces 47 and 49 engage one another.

The shoulders 28 and 30 restrain the nozzle 10 against axial movement in the tubular extension 12 while rotational movement of the nozzle in the tubular spigot is prevented by the flat surfaces 47 and 49. When the spray nozzle 10 has been thus fitted in the tubular extension 12, the deflector plate 26 is orientated in a desired direction with respect to the fluid line 14. The surfaces 47 and 49 prevent the spray nozzle from becoming disorientated.

Liquid which flows from the supply line 14 through the opening 16 is discharged into the diverging part 38 of the passage 36 and after passing through the passage 36 is discharged onto the deflector plate 26. The liquid on making contact with the deflector plate 26 is dispersed and washes over the edge 50 of the deflector plate in the form of a spray.

The spray nozzle 10 may be employed in ore washing screens. The liquid e.g. water, employed in such ore washing screens is usually recycled and quite often contains ore fragments. Should such an ore fragment lodge in the diverging part 38 of the passage 36, the force of the liquid on the fragment will cause it to be wedged in the divergent part 38. This wedging action will have the effect of forcing the tubular wall of the spigot in which the divergent part 38 is defined, to deflect in a radially outward direction. The effect of this deflection will be that the annular shoulder 28 is forced more tightly against the annular shoulder 20, and thereby dislodgement of the spray nozzle from the tubular extension 12 due to the obstruction caused by the ore fragment and the liquid pressure acting thereon, will be resisted. Due to the diminished flow of liquid from the obstructed spray nozzle, this will be easily visible. The spray nozzle can then be removed from the tubular spigot 24 by pulling on the deflector plate 26 in an axial direction to thereby extract the tubular spigot 24 from the tubular extension 12. The obstructing ore fragment may then be removed and the spray nozzle may then be replaced.

FIG. 5 shows a tool 52 to facilitate the removal of the spray nozzle 10 from the tubular spigot 12. The tool 52 is a lever, for example of steel plate, and has a handle portion 54 and a forked portion 56 which is engageable with the tubular spigot 24 of the spray nozzle 10.

Referring further to FIG. 5, and also to FIG. 1, the base 58 of the tubular spigot 24 is of a rounded rectangular configuration. Two opposed grooves 60 and 62 are provided in the base portion 58 of the tubular spigot 24. The grooves 60 and 62 are engageable by the prongs 64 and 66 of the forked end 56 of the tool 52 so that the tubular spigot is receivable in the U-shaped recess 68 defined between the prongs 64 and 66. When the tool 52 thus engages the spigot 24, the tool is manipulated at the handle portion 54 so that by the lever action thus effected by the prongs 64 and 66 between the base portion 58 and the tubular extension 12, the spray nozzle 10 is prised loose from the tubular extension 12. Thereby the spray nozzle 10 can be extracted from the tubular extension 12.

One advantage of a spray nozzle in accordance with the invention is that the nozzle can be easily and quickly fitted to and removed from a fluid supply line. Thereby time and labour are saved and thus cost savings can be effected in for example ore washing screens in which such spray nozzles are employed.

A further advantage of a spray nozzle in accordance with the invention is that the nozzle can be easily maintained orientated in a desired direction.

I claim:

1. A spray nozzle, readily removable from and replaceable in a fluid pressure line for use primarily in ore washing operations where the wash water is recirculated through the nozzles and there is a high incidence of partial or complete nozzle blockage due to ore particles too large to pass through the nozzle comprising:

integral spigot and spray forming parts of resilient plastic material, said spigot being circular and having an annular groove in its outer surface to sealingly engage a slightly larger annular shoulder on the inner surface of the fluid pressure line, said spigot having a fluid passage therethrough, the end of said passage upstream of said groove converging in the direction of fluid flow and the outer surface of said upstream end diverging in the direction of fluid flow to define a tapered gap with the interior surface of the fluid line, said spigot having at least one axially extending slot through the portion upstream of said groove, at least one flat on the outer surface of said spigot to engage a corresponding flat on the inner surface of the fluid line to prevent rotation of said nozzle in its assembled position, said spray forming part being a curved fan shaped member positioned in the path of fluid discharged from said passageway and having a pair of ridges diverging outwardly from said passageway to contain the fluid therebetween and means defining a pair of straight parallel grooves on the outer surface of said spigot part spaced equally outwardly of said annular groove to lie beyond the end of the fluid line in the assembled position of the nozzle, whereby a bifurcated tool may be inserted in said grooves to engage the end of the fluid line for prying the nozzle out of the line.

* * * * *